(12) United States Patent
Kok et al.

(10) Patent No.: US 6,605,773 B2
(45) Date of Patent: Aug. 12, 2003

(54) THERMOELECTRIC GENERATOR FOR A VEHICLE

(75) Inventors: Daniel Benjamin Kok, Klimmen (NL); Rainer Busch, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,568

(22) Filed: Jan. 18, 2002

(65) Prior Publication Data

US 2002/0117198 A1 Aug. 29, 2002

(30) Foreign Application Priority Data

Jan. 27, 2001 (EP) .............................. 01101915

(51) Int. Cl.⁷ ........................... H01L 35/02; H01M 8/04
(52) U.S. Cl. ........................ 136/242; 429/23; 429/24
(58) Field of Search .................... 136/203, 205, 136/242; 429/9, 22, 23, 24

(56) References Cited

U.S. PATENT DOCUMENTS 4,148,192 A * 4/1979 Cummings .................. 180/65.2
6,100,671 A * 8/2000 Kanesaka .................... 136/204

FOREIGN PATENT DOCUMENTS

JP 2001-028805 * 1/2001

* cited by examiner

Primary Examiner—Patrick Ryan
Assistant Examiner—Thomas H. Parsons
(74) Attorney, Agent, or Firm—Carlos L. Hanze

(57) ABSTRACT

A thermoelectric generator includes a thermal generator to which thermal energy is provided from a heat source. In order to keep the output voltage of the thermal generator in a range suitable for charging a battery or for directly feeding into the vehicle's electrical system, the rate of heat production of the heat source and/or the cooling power of a cooling device for the thermal generator is controlled by a regulator. For this purpose, the regulator is connected to a temperature sensor which is mounted on the thermal generator. The regulator can be more cost-effectively configured than a D.C. converter between the output side of the thermal generator and the battery so that this converter can be dispensed with.

10 Claims, 1 Drawing Sheet

THERMOELECTRIC GENERATOR FOR A VEHICLE

BACKGROUND OF INVENTION

1. Technical Field of the Invention

The invention relates to a thermoelectric generator for a vehicle, containing a thermal generator which is thermally coupled to a heat source, and a regulator for ensuring a defined output voltage of the thermal generator. In addition, the invention relates to a motor vehicle with an electric drive.

2. Background Art

A source for supplying the electrical systems contained in a motor vehicle with electrical power is required. This is particularly true for what are referred to as electric cars which are driven by an electric motor. In order to temporarily store the required electrical power, a rechargeable battery (accumulator) to which the current loads, can be connected is generally provided. However, because the storage capacity of such a battery is limited, it must be charged from time to time or continuously in order to ensure that the motor vehicle can operate over relatively long periods. These motor vehicles are generally known under the name hybrid vehicles.

In this respect it is known to use in a motor vehicle a thermoelectric generator whose thermal generator can generate an electrical voltage from thermal energy using a temperature difference. Electric loads can then be operated directly and/or a storage battery can be charged with this electrical voltage. The conversion of a temperature difference into an electrical voltage is based in a known manner, wherein the contact voltage between two different materials (in particular metals) is temperature-dependent. In order to ensure sufficient electrical power, the thermal generator is typically connected to an active heat source such as a fuel cell or a controlled heat exchanger. Furthermore, the thermal generator is preferably coupled to a cooling means such as a heat sink.

The output voltage of such a thermal generator depends greatly on the prevailing temperature difference. Because, on the other hand, the electrical systems such as the battery to be charged, for example, require voltage conditions which are as defined as possible, in known systems an electronically controlled D.C. converter (D.C./D.C. converter) which converts the fluctuating output voltages of the thermal generator into voltages from a usable, defined range is used. However, such a converter has the disadvantage that it is comparatively complex and therefore expensive. Furthermore, the efficiency of a D.C./D.C. converter is not optimum so that unnecessary power losses occur.

Against this background, a non-limiting object of the present invention is to provide a thermoelectric generator for a motor vehicle or the like which is more cost-effective to manufacture. An advantage is that the generator as disclosed herein is suitable in particular for a motor vehicle with an electric drive, that is to say one with high power consumption, and also be suitable for supporting a vehicle's electrical system in conventional motor vehicles.

SUMMARY OF INVENTION

A thermoelectric generator for a motor vehicle accordance with the present invention includes a thermal generator for converting a temperature difference into an electrical voltage, the thermal generator being coupled to a heat source which primarily provides the energy to be converted Furthermore, the generator contains a regulator for ensuring a defined output voltage, that is to say an output voltage having a predefined desired value and/or having a predefined desired interval. This regulator is configured in such a way and is connected to appropriate equipment in such a way that the regulator keeps the temperature conditions at the thermal generator in a range that ensures an output voltage with the desired defined values.

In contrast to known thermoelectric generators, the desired output voltage is accordingly not ensured by a D.C. converter which electrically or electronically adapts the variable output voltage of the generator to the desired value range. Instead, the relationship between the temperature conditions at the thermal generator and the output voltage generated by the thermal generator is utilized so that the output voltage can also be regulated by controlling the temperature conditions. Here, an advantage is that the control of the temperature conditions at the thermal generator can be more easily achieved and more cost-effectively than by the electrical or electronic conversion of the output voltage.

The regulator for the temperature conditions at the thermal generator is preferably connected to at least one temperature sensor which provides information on the temperatures prevailing at the thermal generator. This temperature sensor is preferably arranged at the heat source or at the thermal generator. It is particularly preferred if two temperature sensors which sense the relevant lowest or highest temperature for the voltage generation are arranged at the thermal generator. The measured temperature can be used by the regulator as a controlled variable which is to be kept at a predefined value or in a predefined value range. Alternatively, or in addition, other controlled variables can also be used, for example the output voltage generated by the thermal generator can be used directly.

According to a preferred embodiment of the invention, the regulator for the thermal generator is connected to the heat source in such a way that it can influence its heat production. If the heat source is, for example, a fuel cell, the rate of heat production can be changed by the regulator by changing the fuel supply. The rate of heat production can thus be used as a manipulated variable by the regulator.

According to another embodiment of the invention, the regulator can be connected alternatively, or in addition, to a cooling device for the thermal generator so that it can influence the cooling power of this cooling device. In this case, the cooling power or rate of dissipation of heat at the thermal generator is used as manipulated variable by the regulator.

The regulator preferably uses the cooling power of a cooling device and the rate heat production of the heat source simultaneously as manipulated variables in order to influence the temperature conditions in the thermal generator in the desired fashion. Using both influencing possibilities has the advantage that a relatively large range of conditions of use can be utilized and that the generation of power can be carried out with better efficiency.

The thermoelectric generator is preferably connected at the output end to a storage device for the generated electric power. The storage device can be, in particular, a rechargeable battery (accumulator). This has the advantage that the thermoelectric generation of power can take place continuously in a respectively optimum range, independently of the power consumption of the motor vehicle at any given time.

The invention also relates to a motor vehicle with an electric drive, that is to say with an electric motor which can directly drive the wheels of the motor vehicle. The electric motor can be provided here as the sole drive source of the motor vehicle (electric car) or can be used in a hybrid vehicle together with an internal combustion engine. A motor vehicle with an electric drive has a high power consumption which can be satisfied in particular by means of a thermoelectric generator. Here, the generator is advantageously embodied in one of the ways explained above.

BRIEF DESCRIPTION OF DRAWINGS

For a complete understanding of the present invention and the advantages thereof, reference is now made to the following description taken in conjunction with the accompanying wherein FIG. 1. is a schematic view of the components of a motor vehicle in accordance with the present invention.

DETAILED DESCRIPTION

Figure 1:
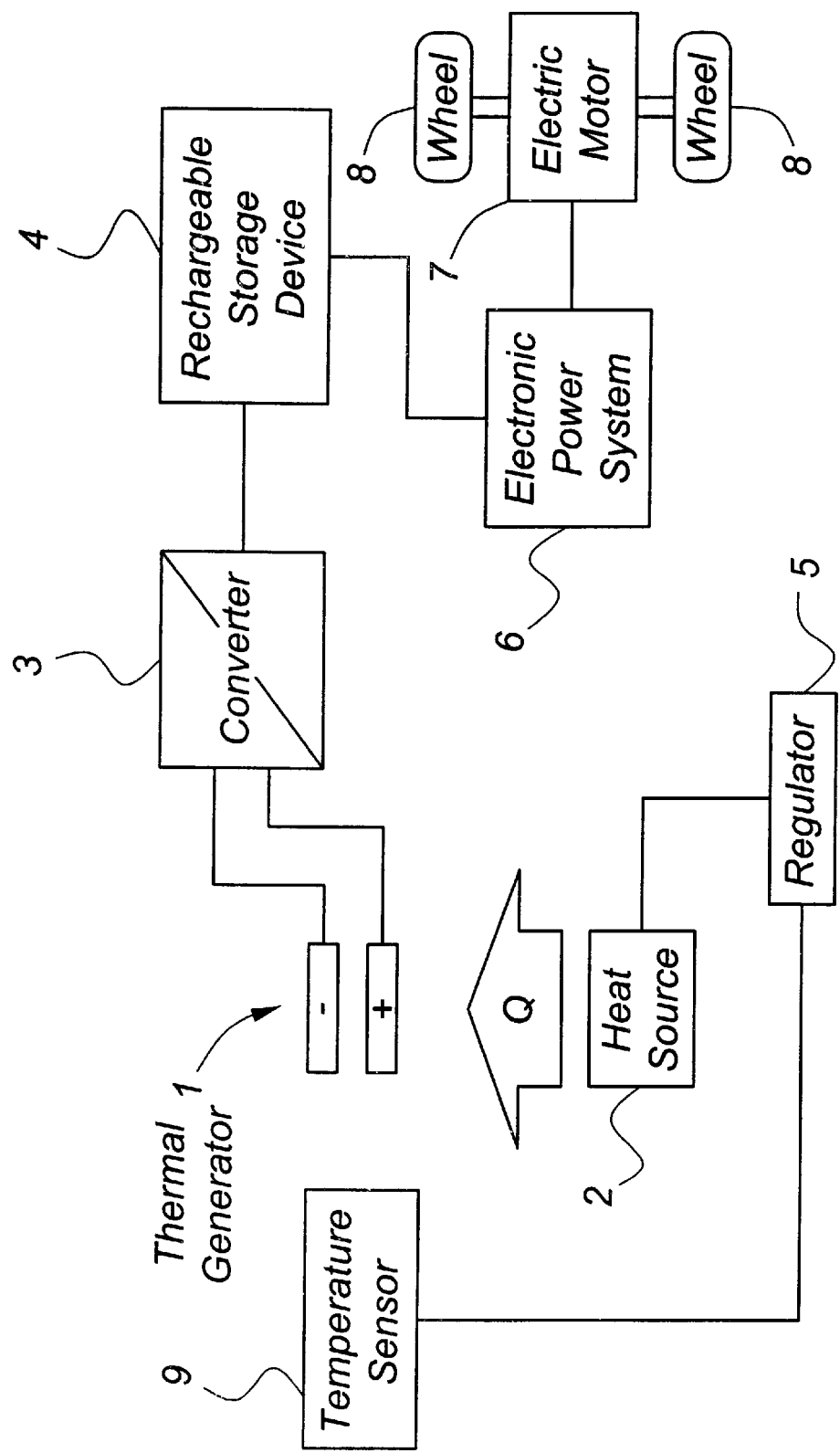
As shown in FIG. 1, a motor vehicle has an electric drive in the form of an electric motor 7 which drives the wheels 8 of an axle of the motor vehicle, if appropriate via one or more intermediately connected transmissions. The electric motor 7 is supplied with energy and controlled by an electronic power system 6. The electronic power system 6 obtains the required energy itself from a rechargeable storage device 4, which is typically a battery or a supercapacitor.

So that it is possible to ensure a sufficient quantity of power in the battery 4 even during relatively long journeys, a thermoelectric generator is provided in the motor vehicle. The generator is composed essentially of a thermal generator 1 which can directly convert heat into electric power given the presence of a temperature difference. The thermal energy which is to be converted is generated here by a heat source 2 which is thermally coupled to the thermal generator 1 (see arrow for the direction of the heat flow Q). The heat source 2 can be, for example, a fuel cell or a controllable heat exchanger.

Both the generated idling voltage and the conversion efficiency of the thermal generator 1 depend on the operating temperatures of the thermal generator. In order to be able to use the thermal generator 1 together with an energy storage device 4 or a drive system 6, 7, 8, the output D.C. voltage of the thermal generator must be converted to a usable range. To do this, it is possible to use, in particular, a D.C. converter 3 which is arranged between the output of the thermal generator 1 and the load or the battery 4 and is electronically regulated. However, such a converter is comparatively expensive and has power losses.

The invention therefore proposes to omit the converter 3 illustrated in the figure (or to configure it in a very simple and cost-effective way) and to provide instead a more favorable way of regulating the output voltage of the thermal generator 1.

This regulation of the thermal generator 1 according to the invention is carried out by the regulator 5 which influences the temperature on the hot side, on the cool side or on both sides of the thermal generator. For this purpose, the regulator 5 is connected to at least one temperature sensor 9 which measures a relevant temperature in the thermal generator 1. Preferably, two temperature sensors measure the high temperature level and the low temperature level in the thermal generator 1.

There are various possible ways in which the regulator 5 can influence the temperature in the thermal generator 1. In the variant illustrated in FIG. 1, the regulator 5 influences the rate of heat production in the heat source 2. If the heat source 2 is, for example, a fuel cell, the regulator 5 can regulate the fuel supply to the burner in order to influence the heat production and thus the temperature in the thermal generator 1.

Alternatively, or in addition, the regulator 5 can also influence the temperature of the cool side of the thermal generator 1. If the cool side is cooled, for example, with water, the regulator 5 could influence the temperature and/or the feed rate of the cooling water.

The possibility of dispensing with the D.C. converter 3 and nevertheless being able to ensure the desired output voltages permits a significantly more cost-effective configuration of the generation of power in the motor vehicle. This applies all the more in view of the fact that a basic control means for the generation of heat in the heat source 2 and/or for the cooling of the thermal generator 1 is often already provided in any case so that essentially all that is necessary is to prescribe other objectives, dependent on the temperature conditions in the thermal generator 1, for these regulators.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A thermoelectric generating system for a vehicle having a fuel cell and a corresponding fuel supply, the thermoelectric generating system comprising
  a thermal generator thermally coupled to the fuel cell; and
  a regulator coupled to the fuel supply for controlling the supply of fuel to the fuel cell so as to control a rate of heat production of the fuel cell and an output voltage of the thermal generator.

2. The thermoelectric generating system according to claim 1, further comprising at least one temperature sensor coupled to said regulator.

3. The thermoelectric generating system according to claim 1, further comprising at least one voltage sensor coupled to said regulator.

4. The thermoelectric generating system according to claim 1, further comprising a cooling device coupled to said thermal generator and said regulator for controlling the output voltage of said thermal generator.

5. The thermoelectric generating system according to claim 1, further comprising an electrical storage device coupled to said thermal generator.

6. The thermoelectric generating system according to claim 1, wherein said thermal generator is coupled to an electrical system of the motor vehicle.

7. A vehicle comprising:
  at least one fuel cell;
  a fuel supply for said at lease one fuel cell;
  a thermal generator thermally coupled to the at least one fuel cell; and
  a regulator coupled to said fuel supply for controlling the supply of fuel to said at least one fuel cell so as to control a rate of heat production of said at least one fuel cell and an output voltage of the thermal generator.

8. A thermoelectric generating system for a vehicle having a fuel cell and a corresponding fuel supply, the thermoelectric generating system comprising:
  a thermal generator thermally coupled to the fuel cell;

a cooling device coupled to said thermal generator, said cooling device comprising a coolant; and a regulator coupled to said cooling device and said thermal generator for controlling one or both of the temperature and flow rate of the coolant so as to regulate an output voltage of said thermal generator.

9. The thermoelectric generating system according to claim 1, wherein said coolant is water.

10. A vehicle comprising;

at least one fuel cell;

a fuel supply for said at least one fuel cell;

a thermal generator thermally coupled to the at least one fuel cell; and a cooling device coupled to said thermal generator said cooling device comprising a coolant; and a regulator coupled to said cooling device and said thermal generator for controlling one or both of the temperature and flow rate of the coolant so as to regulate an output voltage of said thermal generator.

* * * * *